No. 796,033. PATENTED AUG. 1, 1905.
T. DUNCAN.
ELECTRIC METER.
APPLICATION FILED JUNE 26, 1901. RENEWED JAN. 7, 1905.
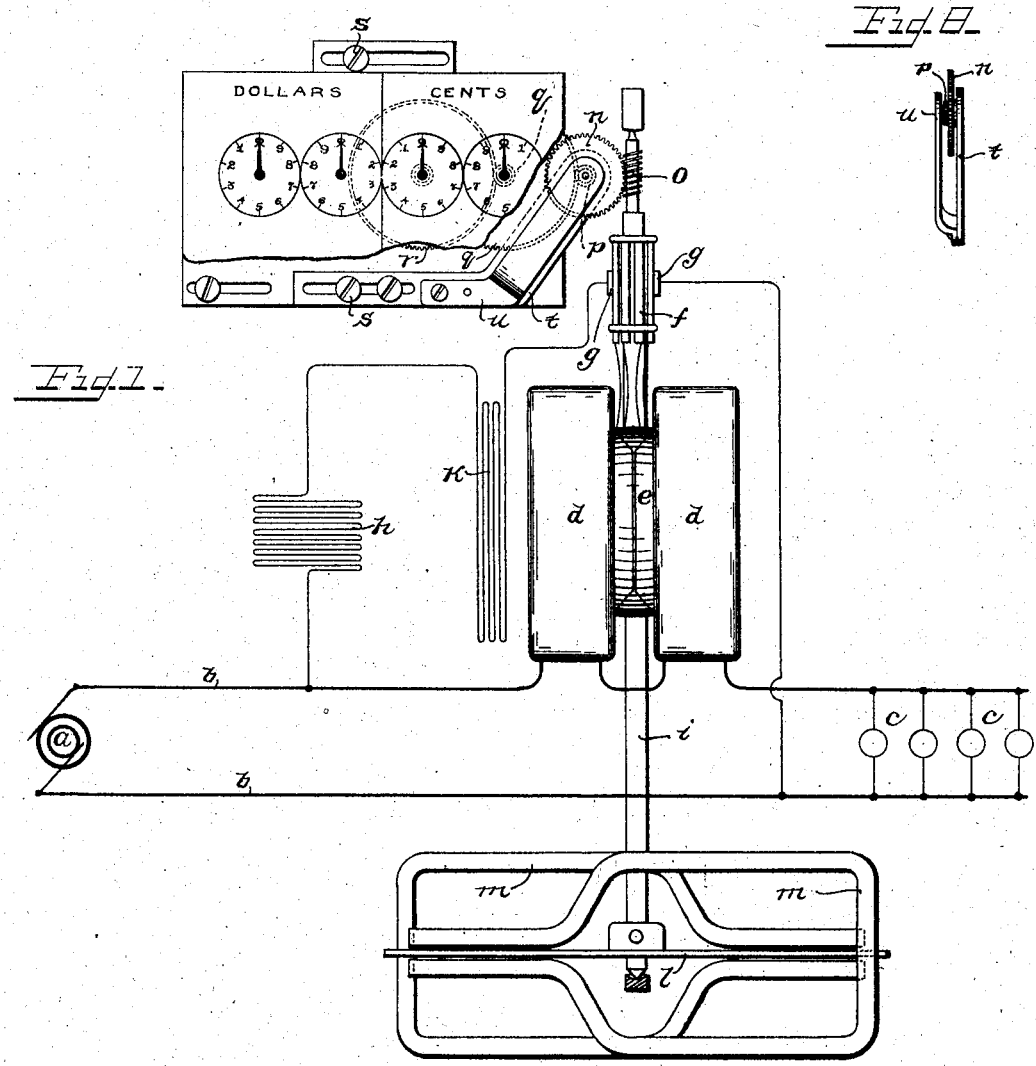
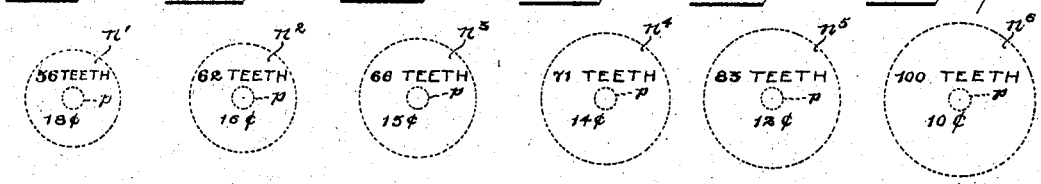

UNITED STATES PATENT OFFICE.

THOMAS DUNCAN, OF CHICAGO, ILLINOIS.

ELECTRIC METER.

No. 796,033.           Specification of Letters Patent.           Patented Aug. 1, 1905.

Application filed June 26, 1901. Renewed January 7, 1905. Serial No. 239,966.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to meters, and has for its object the provision of an improved form of meter whereby the consumer can ascertain without calculation and without special knowledge of the instrument the cost of his service.

My invention is best adapted for electrical measuring instruments, as wattmeters; and it consists, broadly speaking, in the provision of a counting-train and suitably-graduated dials marked in units of money, the dial-indexes serving to indicate the totalized cost of current consumption.

In practicing my invention I employ interchangeable value-wheels of a counting-train, which serve to control the rate at which the counting-train is actuated for a given amount of current, so that the counting-train will be operated not only in proportion to the current, but also to indicate the cost of the current. While I have stated that interchangeable wheels of a counting-train are employed for accomplishing this result, I do not wish to be limited to this means.

Consumers of electrical energy are usually unfamiliar with electrical terms and are not able to check the operations of the meter and the bills for power service, having to trust usually to the accuracy of the inspector taking the readings. This is true, because the dial of the instrument is marked in terms of electrical energy—as ampere-hours, lamp-hours, watt-hours, kilowatt-hours, or board of trade units—the cost of which is calculated by the company. By integrating the money equivalent of the energy consumed mistakes on the part of the company's instrument readers are avoided and the user is able to satisfy himself from time to time as to the accuracy of the readings, he being thereby relieved of surprise in cost. The consumer may read the instrument day after day in dollars and cents, whereby any apparently exaggerated increase in the reading of the instrument may be investigated to determine whether the cause is upon the premises of the consumer or a fault of the instrument. He need not wait until the bills for the various periods of service are at hand before making a complaint or ordering an investigation.

I will explain my invention more fully by reference to the accompanying drawings, in which—

Figure 1 shows a system of alternating-current distribution with an instrument embodying my invention connected in circuit therewith. Figs. 2, 3, 4, 5, 6, and 7 illustrate value-wheels that may be substituted for each other in the counting mechanism. Fig. 8 is a side view of a bracket for supporting one of the value-wheels.

Like features are indicated by similar characters of reference throughout the different figures.

I have shown an alternating-current generator $a$ supplying current to transmission-mains $b\ b$, that convey current to translating devices $c\ c$, which may be incandescent lamps, motors, or other instrumentalities. I do not wish, however, to be limited to an alternating-current system of distribution, as my invention is equally applicable to other systems of distribution.

In the specific application of the invention illustrated the measuring instrument is in the form of a commutated alternating-current wattmeter provided with field-coils $d\ d$ and an armature $e$ in inductive relation therewith, the fields of the armature and field-coils being in phase when the current and pressure in the working circuit are in phase. The field-coils are in this instance in series with one of the mains $b$, while the armature is provided with a commutator $f$, which engages brushes $g\ g$, that are connected with the mains $b\ b$ and which include the armature in bridge of the transmission-mains, a resistance $h$ being included in the same bridge. Thus, in accordance with the well-known practice the field-winding $d$ and the armature $e$ produce fields that are in proportion to the current and pressure, a torque resulting that causes a rotation of the shaft $i$ in proportion to the watts.

A starting-coil $k$ is provided for overcoming friction, &c., while the shaft $i$ is provided with a damping-disk $l$, that coöperates with the damping-magnets $m$ to retard the rotation of the shaft.

It may be assumed, for example, that the instrument illustrated has an initial speed of, say, one revolution per watt-hour—that is, one revolution per minute with sixty watts, or one revolution per hour with one watt. In Fig. 1 I have illustrated an instrument having four dials, the one to the right indicating units of cents; the first to the left of that, tens of cents; the second to the left, units of dollars; the third to the left, tens of dollars. Describing the instrument as adjusted in Fig. 1, the dial may be so marked and the counting mechanism so arranged and constructed that when the spindle $i$ makes one thousand revolutions the first dial-pointer to the right will make two complete revolutions, while the pointer next to the left will make two-tenths of a revolution, the value-wheel $n$ being adapted to produce this rate of operation, the said value-wheel engaging the worm $o$ on the upper end of the shaft. When the worm $o$ makes one thousand revolutions, it causes the value-wheel $n$ to make twenty revolutions, the said value-wheel having fifty teeth. Upon the spindle or hub of the wheel $n$ is a pinion-wheel $p$, that has ten teeth, which wheel drives the wheel $q$. The wheel $q$ may have one hundred teeth, so that during the twenty revolutions of the wheel $n$ and pinion $p$ this wheel $q$ may make two complete revolutions. The large wheel $q$ by rotating twice rotates the wheel $r$ two-tenths of a revolution, the wheel $r$ engaging a pinion $q'$, fixed with relation to the wheel $q$, indicating that twenty cents' worth of energy, or one thousand watt-hours, have been consumed. As the pointer upon the tens-of-cents dial completes each revolution the pointer upon the units-of-dollars dial having a wheel and counting-train meshed therewith moves one space. After the index upon the units-of-dollars dial has moved one complete revolution the index upon the dial of the tens-of-dollars dial moves one space to indicate that ten dollars' worth of current has been consumed. Thus if fifty-six thousand eight hundred watts have been consumed and the rate for the current is twenty cents per thousand watts, the tens-of-dollars-dial index will be at "1," the units-of-dollars-dial index will be at "1," the tens-of-cents-dial index will be at "3," and the units-of-cents-dial index will be at "6." If the rate should be in excess of twenty cents, then a smaller wheel than the wheel $n$ should be substituted therefor to cause a more rapid actuation of the value-indexes for a given current. If the cost is cheaper than twenty cents per kilowatt, then a correspondingly-larger wheel should be substituted. For this purpose a set of interchangeable value-wheels may be supplied with each meter.

I have illustrated value-wheels $n'$ $n^2$ $n^3$ $n^4$ $n^5$ $n^6$ provided, respectively, with fifty-six teeth, sixty-two teeth, sixty-six teeth, seventy-one teeth, eighty-three teeth, and one hundred teeth, each wheel being supplied with a pinion $p$, all the pinions $p$ being provided with ten teeth. The said value-wheels $n'$ $n^2$ $n^3$ $n^4$ $n^5$ $n^6$ when substituted, respectively, for the value-wheel $n$ may cause an operation of the value-counting mechanism at the rate of eighteen cents per one thousand watt-hours, sixteen cents per one thousand watt-hours, fifteen cents per one thousand watt-hours, fourteen cents per one thousand watt-hours, twelve cents per one thousand watt-hours, and ten cents per one thousand watt-hours. To effect this interchange of the value-wheels, I mount the entire counting mechanism upon a fixed support, clamping-screws $s$ $s$ passing through slots in parts fixed with relation to the counting mechanism, whereby the said counting mechanism may be moved from or toward the shaft $i$ to permit an interchangeable value-wheel to be inserted between the worm-shaft $o$ and the balance of the counting mechanism. Brackets $t$ $u$ are provided, the bracket $u$ being removable, so that the interchangeable value-wheels may be readily inserted and removed.

While I have herein shown and particularly described the preferred embodiment of my invention, I do not wish to be limited to the precise disclosure thereof herein set forth; but,

Having thus described my invention, I claim as new and desire to secure by Letters Patent—

1. A meter including as elements a counting-train and a meter-shaft in gear therewith, a mounting for one of said elements permitting the adjustment and the secure fixing of the relative positions of the meter-shaft and counting-train to permit of a permanent change in the size of a gear element.

2. A meter including a counting-train and a meter-shaft in gear therewith, a mounting for said counting-train permitting the adjustment and the secure fixing of the relative positions of the meter-shaft and counting-train to permit of a permanent change in the size of a gear element.

In witness whereof I hereunto subscribe my name this 23d day of May, A. D. 1901.

THOMAS DUNCAN.

Witnesses:
GEORGE L. CRAGG,
HERBERT F. OBERGFELL.